United States Patent [19]

Sygnator

[11] Patent Number: 5,060,797
[45] Date of Patent: Oct. 29, 1991

[54] COLLATED NAILS HAVING TAPE RECESSES

[75] Inventor: Henry A. Sygnator, Arlington Heights, Ill.

[73] Assignee: Illinois Tool Works Inc., Glenview, Ill.

[21] Appl. No.: 597,023

[22] Filed: Oct. 15, 1990

[51] Int. Cl.5 .............................................. B65D 85/24
[52] U.S. Cl. .................... 206/345; 206/343; 206/344; 411/442
[58] Field of Search ............... 206/338, 343, 344, 345, 206/346; 411/442, 443

[56] References Cited

U.S. PATENT DOCUMENTS

| | | | |
|---|---|---|---|
| 159,777 | 2/1875 | Sturtevant | 206/345 |
| 3,358,822 | 12/1967 | O'Connor | 206/345 |
| 3,515,271 | 6/1970 | Bader | 206/346 |
| 3,851,759 | 12/1974 | Young et al. | 206/338 |
| 3,935,945 | 2/1976 | Smith et al. | 206/343 |
| 3,966,042 | 6/1976 | Shelton et al. | 206/338 |
| 4,162,728 | 7/1979 | Uzumcu et al. | 206/345 |
| 4,250,996 | 2/1981 | Bartz | 206/343 |
| 4,343,579 | 8/1982 | Shelton et al. | 411/442 |
| 4,815,910 | 3/1989 | Potucek | 206/343 |
| 4,836,372 | 6/1989 | Shelton | 206/345 |
| 4,971,503 | 11/1990 | Barnell et al. | 411/443 |

Primary Examiner—David T. Fidei
Attorney, Agent, or Firm—Schwartz & Weinrieb

[57] ABSTRACT

A strip of collated nails wherein, upon each side of the strip, a tape extends across and is adhered to a flat surface defined by means of a tape recess of the shank of each nail, and between two end surfces defined thereby. Each tape is adhered by means of an adhesive layer between such tape and the flat surfaces upon each side of the strip, at an acute angle relative to two axially extending sides of the flat surfaces upon each side of the nail shank.

18 Claims, 1 Drawing Sheet

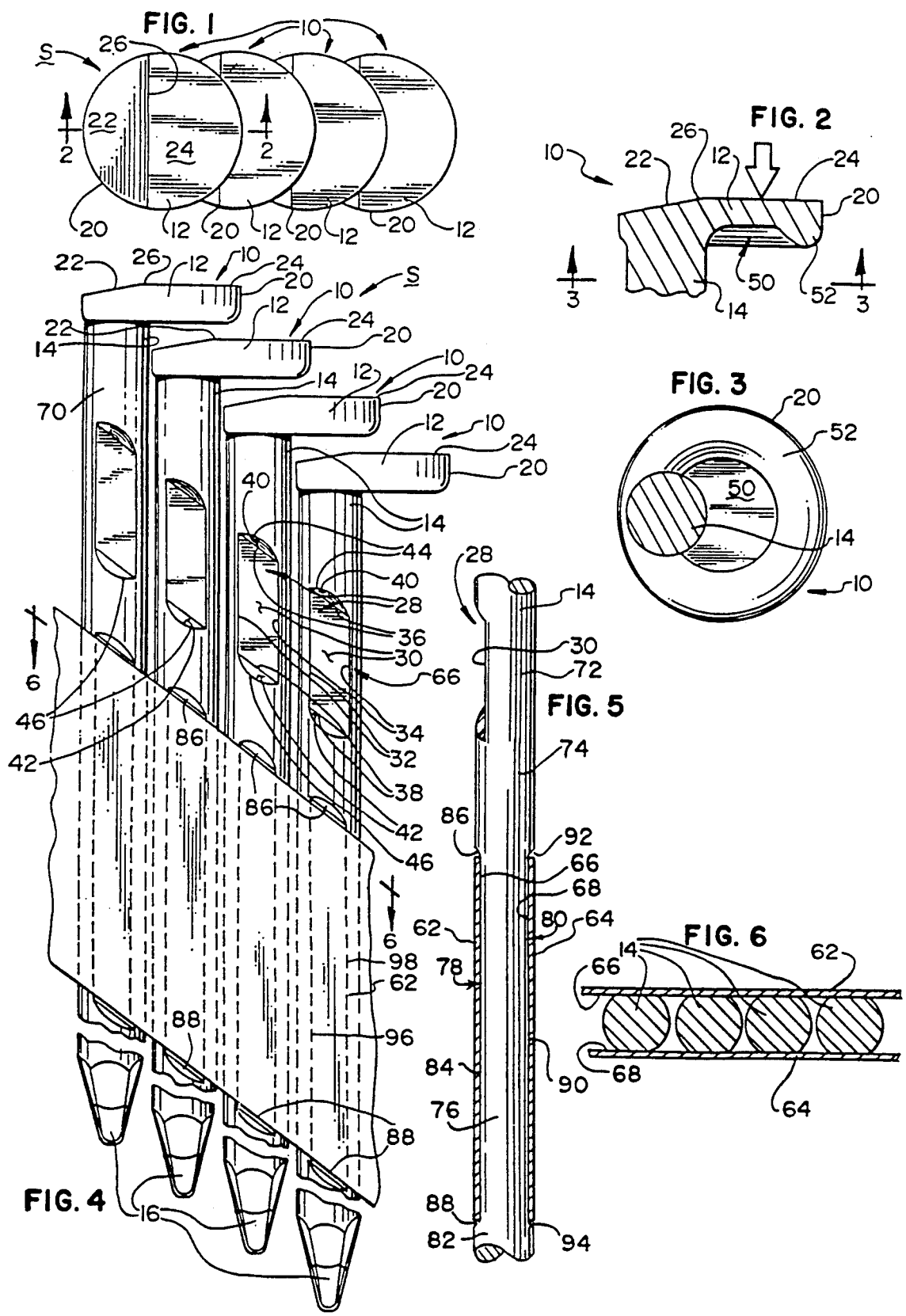

COLLATED NAILS HAVING TAPE RECESSES

TECHNICAL FIELD OF THE INVENTION

This invention pertains to a strip of collated nails wherein the shank of each nail has a recess for a collating tape or a pair of recesses for a pair of collating tapes.

BACKGROUND OF THE INVENTION

A particularly vexing problem with collated nails is the problem of flagging. The flagging problem can be especially troublesome with nails that have been collated by means of tapes extending across and being adhesively adhered to the shanks of the nails.

Flagging occurs when a fragment of tape becomes caught under the head of a nail driven from a strip of collated nails into a workpiece by means of a rapidly acting, nail-driving tool, such as, for example, a pneumatically powered or combustion-powered nail-driving tool. Besides the fragment being unacceptable from an aesthetic standpoint, the fragment prevents the nail from being fully driven into the workpiece.

A surprisingly simple solution to the flagging problem in connection with ring-shanked, threaded, barbed, and other special-purpose nails, which may be tape-collated, is disclosed in Shelton U.S. Pat. No. 4,836,372.

There has been a need, to which this invention is addressed, for a comparably simple solution to the flagging problem in connection with wire nails besides those special-purpose nails of primary concern in the Shelton patent noted above.

SUMMARY OF THE INVENTION

This invention provides a strip of collated nails wherein each strip has a head and a shank of a novel configuration. The shank has an axis and comprises, as measured across (that is, through) the strip, a plurality of relatively thick portions and a relatively thin portion.

One relatively thick portion adjoins the head. The relatively thin portion is spaced from the head at least by means of the relatively thick portion adjoining the head. Another relatively thick portion adjoins the relatively thin portion. The relatively thick portions are cylindrical and have equal diameters.

The relatively thin portion defines a tape recess defining a flat surface, the plane of which is preferably parallel to the axis of the shank. The nails are collated by means of a tape extending across and being adhered to the flat surface defined by means of the tape recess of the shank of each nail. The tape is adhered to the flat surfaces of the shanks of the nails by means of an adhesive layer between the tape and those surfaces.

In a preferred arrangement for the strip of collated nails, the relatively thin portion of the shank of each nail has a pair of tape recesses defining a pair of flat surfaces, which preferably are disposed parallel to the axis of the shank of such nail and which preferably are spaced equally from the axis of the shank. The flat surfaces are diametrically opposed with respect to each other. In the preferred arrangement, the nails are collated by means of a pair of tapes.

Each tape extends across and is adhered to the flat surface defined by means of a respective one of the tape recesses of the shank of each nail. Each tape is adhered by means of an adhesive layer interposed between such tape and the flat surface defined upon the shank of each nail.

Preferably, each tape and the adhesive layer adhering such tape have, as measured across the strip, a combined thickness that does not exceed one-half of the difference in thickness defined between the relatively thin and relatively thick portions of the shanks of the nails.

It is preferred that the flat surface defined by each of the tape recesses of each nail has two axially extending sides. Each tape may then be adhered at an acute angle relative to the axially extending sides of the flat surfaces to which such tape is adhered.

It is a significant advantage of a strip of collated nails according to this invention that a nail driven from the strip into a workpiece tends to carry into the workpiece, along with the driven nail, such portions of the tape or tapes and of the adhesive layer or adhesive layers as may be torn from the strip with the driven nail. Thus, the flagging problem tends to be substantially eliminated.

BRIEF DESCRIPTION OF THE DRAWINGS

These and other objects, features, and advantages of this invention will become evident from the following description of a preferred embodiment of this invention, with reference to the accompanying drawings, in which like reference characters designate like or corresponding parts throughout the several views, and wherein:

FIG. 1 is a plan view of a portion of a strip of collated wire nails according to a preferred embodiment of this invention.

FIG. 2, on a slightly enlarged scale as compared to that of FIG. 1, is a sectional view taken through one of the wire nails, along line 2—2 of FIG. 1, in a direction indicated by means of the arrows.

FIG. 3 is a sectional view taken through the same nail, along line 3—3 of FIG. 2 in a direction indicated by means of the arrows.

FIG. 4 is an elevational view of the strip shown in FIG. 1. Portions of the shanks of the wire nails, between the tips of such nails and two collating tapes, have been omitted.

FIG. 5 is a fragmentary, elevational view of one of the wire nails and the collating tapes, as taken from one side of the strip shown in FIGS. 1 and 4.

FIG. 6 is a sectional view taken through the strip, along line 6—6 of FIG. 4, in a direction indicated by means of the arrows.

DETAILED DESCRIPTION OF PREFERRED EMBODIMENTS

Although a preferred embodiment of this invention is illustrated in the drawings and is described below, it is to be here understood that this invention is not limited to such an embodiment.

According to a preferred embodiment of this invention, a strip S of collated wire nails 10 is shown in FIGS. 1, 4, 5, and 6.

Except as disclosed herein, the strip S of collated nails 10 is similar to a strip of collated wire nails disclosed in a copending application filed simultaneously herewith, under application Ser. No. 597,025, and assigned commonly herewith. Also, except as disclosed herein, each nail 10 is similar to each nail disclosed in the copending application. The copending application is entitled "Wire Nail, Strip of Collated Wire Nails, and Related Apparatus." The disclosure of the copending application is incorporated herein by reference.

An exemplary nail 10 is described below. The nail 10 has a unique head 12 and a unique shank 14 integral with the head 12.

The shank 14 defines an axis and has a pointed tip 16. Preferably, as shown, the tip 16 conforms to the unique tip disclosed in Sygnator U.S. Pat. No. 4,927,309, the disclosure of which is incorporated herein by reference. Alternatively, the shank 12 may have a conventional tip (not shown) having four facets.

The head 12 has a circumferential edge 20 conforming to a complete circle and defining an axis which is radially offset with respect to the axis of the shank 14. Thus, in other words, the head 12 is radially offset in one direction relative to the shank 14. The head 12 defines a complete circle when viewed axially.

The head 12, at a top portion thereof, has two planar surfaces spaced from the shank 14, namely a first surface 22 and a second surface 24. The second surface 24 intersects the first surface 22 along a crest 26, which extends across the head 12, which has a small radius (approximately 0.093 inch) and which is shorter than a diameter of the complete circle defined by means of the circumferential edge 20 of the head 12. The first surface 22 is oriented at an obtuse, included angle (such as, for example, approximately 168°) relative to the second surface 24 and the second surface 24 is oriented at a right angle relative to the axis of the shank 14.

The shank 14 is formed with a keyway 28 defining a flat surface 30, which is disposed within a plane which is parallel to the axis of the shank 14 and to the direction of radial offset of the head 12 relative to the shank 14, and which is spaced axially from the head 12. The flat surface 30 conforms to a parallelogram having two longer, axially extending sides 32, 34, and two shorter, transversely extending sides 36, 38. These longer and shorter sides define two acute angles (such as, for example, approximately 34° each) and two obtuse angles (such as, for example, approximately 146° each) as shown.

The keyway 28 is bounded by means of two flat surfaces 40, 42, which respectively intersect the flat surface 30 at the shorter sides 36, 38. The flat surface 40 is bounded by means of the side 36 and by means of a curved edge 44 and is oriented at an acute angle (such as, for example, approximately 45°) relative to the axis of the shank 14 and at an obtuse angle (such as, for example, approximately 135°) relative to the flat surface 30. The flat surface 42 is bounded by means of the side 38 and by means of a curved edge 46 and is oriented at an acute angle (such as, for example, approximately 45°) relative to the axis of the shank 14, at an obtuse angle (such as, for example, approximately 135°) relative to the flat surface 30, and at a right angle relative to the flat surface 40.

The keyway 28 provides a datum for orienting the collated nails 10 with their shanks 14 disposed parallel with respect to one another and with their heads 12 offset in a common direction relative to their shanks 14.

Upon a lower or underside portion, the head 12 of the nail 10 has a cavity 50, which is bordered by means of an annular rib 52 except where the shank 14 adjoins the head 12. As contrasted with a head (not shown) that is planar at its lower portion, the head 12 tends to be less prone to separating from the shank 14, particularly if the head 12 is struck at a localized region spaced from the shank 14, such as, for example, that region suggested by means of the wide arrow shown in FIG. 2.

At the annular rib 52, the lower portion of the head 12 defines a tangent plane, which is oriented at a right angle relative to the axis of the head 12, and at a right angle relative to the shank 14.

As shown in FIGS. 4, 5, and 6, the collated nails 10 of the strip S are collated by means of a pair of collating tapes 62, 64. Each of the collating tapes 62, 64, is a polymeric-paper laminate, which may have an outer coating for enhanced lubricity and holding capability. The collating tape 62 has an adhesive layer 66. The collating tape 64 has an adhesive layer 68. The adhesive layers 66, 68, are used to adhere the collating tapes 62, 64, to the shanks 14 of the nails 10.

Preferably, before the nails 10 are collated by means of the collating tapes 62, 64, the nails 10 are oriented in a manner disclosed in a copending application filed simultaneously herewith, under application Ser. No. 597,922, and assigned commonly herewith. The copending application is entitled "Machine and Method for Collating Wire Nails Having Shank Keyways."

As indicated in FIG. 5, the shank 14 of each nail 10 has, as measured across the strip S, a plurality of relatively thick portions, a portion of intermediate thickness, and a relatively thin portion. A relatively thick portion 70 adjoins the head 12. The portion 72 of intermediate thickness includes the keyway 28. A relatively thick portion 74 adjoins the portion 72 including the keyway 28. A relatively thin portion 76 defining a pair of tape recesses 78, 80, adjoins the relatively thick portion 74 and is spaced from the head 12 by means of the portions 70, 72, and 74. A relatively thick portion 82 adjoins the relatively thin portion 76. The pointed tip 16 adjoins the relatively thick portion 82. The relatively thick portions 70, 74, and 82 have equal diameters.

Upon the shank 14 of each nail 10, the tape recess 78 defines a flat surface 84 and two end surfaces 86, 88. Moreover, the tape recess 80 defines a flat surface 90 and two end surfaces 92, 94. Each of the end surfaces of each recess is oriented at an obtuse angle (such as, for example, 135°) relative to the flat surface of such recess. The ends of the tape recess 78 and the ends of the tape recess 80 are inclined at an acute angle (such as, for example, approximately about 36°) relative to the axis of the shank 14. Each of the flat surfaces 84, 90, has two axially extending edges. The axially extending edges 96, 98, of the flat surfaces 84 are shown in FIG. 4.

The collating tape 62 is adhered by means of the adhesive layer 66 to the flat surfaces 84 defined by means of the tape recesses 78 of the shanks 14 of the nails 10, between the end surfaces 86, 88, defined thereby, at a similar angle (such, for example, approximately 36°) relative to the axially extending edges of the flat surfaces 84. The collating tape 64 is adhered by means of the adhesive layer 68 to the flat surfaces 90 defined by means of the tape recesses 80 of the shanks 14 of the nails 10, between the end surfaces 92, 94, defined thereby, at a similar angle (such as, for example, approximately 36°) relative to the axially extending edges of the flat surface 90.

Each of the collating tapes 62, 64, and the adhesive layer adhering it have, as measured across the strip S, a combined thickness that does not exceed one-half of the difference in thickness defined between the relatively thin portion 76 and the relatively thick portions 70, 74, and 82. In other words, such collating tape and the adhesive layer adhering it are not thicker than the depth of either of the tape recesses 78, 80, in a radial sense.

Because the collating tapes 62, 64, are adhered to flat surfaces, rather than to cylindrical surfaces, there tends to be better adhesion between the collating tapes 62, 64, and the nails 10.

Advantageously, a nail 10 driven from the strip S into a workpiece (not shown) tends to carry into the workpiece, along with the driven nail 10, such portions of the collating tapes 62, 64, and of the adhesive layers 66, 68, as may be torn from the strip S along with the driven nail 10. The flagging problem tends to be substantially eliminated.

Various modifications may be made in the strip of collated nails described above without departing from the scope and spirit of this invention. It is therefore to be understood that within the scope of the appended claims, the present invention may be practiced otherwise than as specifically described herein.

I claim:

1. A strip of collated nails, comprising:
   a plurality of nails each of which comprises a head and a cylindrical shank defining a longitudinal axis;
   a prefabricated recess including a flat surface defined within a peripheral portion of each cylindrical nail shank such that said flat surfaces of said recesses of said plurality of nails together define a common planar surface when said nails are rotationally oriented in a common manner about said longitudinal axes of said nail shanks; and
   collating tape means, extending across said plurality of nail shanks and disposed within said plurality of recesses and upon said flat surfaces of said recesses defining said common planar surface, for collating said plurality of nails together as a result of being adhered to said flat surfaces of said recesses solely by an adhesive layer interposed between said collating tape and said flat surfaces of said recesses,
   whereby a nail driven from said strip of collated nails into a workpiece tends to carry into said workpiece, along with said driven nail, such portions of said collating tape and said adhesive layer as may be torn from said strip of collated nails along with said driven nail.

2. A strip of collated nails, comprising:
   a plurality of nails each of which comprises a head and a cylindrical shank defining a longitudinal axis;
   a prefabricated recess including a flat surface defined within diametrically opposite peripheral portions of each cylindrical nail shank such that said flat surfaces of said recesses of said plurality of nails together define a pair of diametrically opposed common planar surfaces when said nails are rotationally oriented in a common manner about said longitudinal axes of said nail shanks; and
   a pair of collating tape means, extending across said plurality of nail shanks and disposed within said plurality of recesses and upon said flat surfaces of said recesses defining said pair of diametrically opposed common planar surfaces, for collating said plurality of nails together as a result of being adhered to said flat surfaces of said recesses solely by an adhesive layer interposed between said pair of collating tape means and said flat surfaces of said recesses,
   whereby a nail driven from said strip of collated nails into a workpiece tends to carry into said workpiece, along with said driven nail, such portions of said pair of collating tape means and said adhesive layers as may be torn from said strip of collated nails along with said driven nail.

3. The strip of collated nails of claim 1 wherein, for each nail, the flat surface is disposed parallel to said longitudinal axis of said shank.

4. The strip of claim 2 wherein each tape and the adhesive layer adhering such tape have, as measured across the strip, a combined thickness that does not exceed the depth of said prefabricated recesses defined within said diametrically opposed peripheral portions of said cylindrical nail shanks such that outer surfaces of said collating tapes are disposed substantially flush with non-recessed peripheral portions of said cylindrical nail shanks.

5. The strip of claim 2 wherein the flat surface defined by the tape recess of the shank of each nail has two axially extending edges, and wherein each tape is adhered at an acute angle relative to the axially extending edges of the flat surfaces to which such tape is adhered.

6. The strip of claim 4 wherein the flat surface defined by the tape recess of the shank of each nail has two axially extending edges, and wherein each tape is adhered at an acute angle relative to the axially extending edges of the flat surfaces to which such tape is adhered.

7. A strip of collated nails as set forth in claim 2, wherein:
   each of said flat surfaces of each of said nails is disposed parallel to said longitudinal axis of each of said nails.

8. A strip of collated nails as set forth in claim 1, wherein:
   said collating tape means and said adhesive layer adhering said collating tape means to said plurality of nails have a combined thickness which does not exceed the depth of said prefabricated recesses defined within said peripheral portions of said cylindrical shanks of said nails such that an outer surface of said collating tape means is disposed substantially flush with non-recessed peripheral portions of said cylindrical nail shanks.

9. A strip of collated nails as set forth in claim 1, wherein:
   each of said flat surfaces of said recesses comprises a pair of laterally spaced, axially extending edges disposed parallel to said longitudinal axis of each of said nail shanks; and
   said collating tape means is adhered to said plurality of nail shanks at an acute angle with respect to said axially extending edges of said flat surfaces of said recesses of said nail shanks.

10. A strip of collated nails as set forth in claim 8, wherein:
    each of said flat surfaces of said recesses comprises a pair of laterally spaced, axially extending edges disposed parallel to said longitudinal axis of each of said nail shanks; and
    said collating tape means is adhered to said plurality of nail shanks at an acute angle with respect to said axially extending edges of said flat surfaces of said recesses of said nail shanks.

11. A strip of collated nails as set forth in claim 9, wherein:
    said flat surfaces each having a configuration which is substantially that of a parallelogram.

12. A strip of collated nails as set forth in claim 9, wherein:
    said acute angle is approximately 36°.

13. A strip of collated nails as set forth in claim 10, wherein:
said flat surfaces each have a configuration which is substantially that of a parallelogram.

14. A strip of collated nails as set forth in claim 10, wherein:
said acute angle is approximately 36°.

15. A strip of collated nails as set forth in claim 5, wherein:
said flat surfaces each have a configuration which is substantially that of a parallelogram.

16. A strip of collated nails as set forth in claim 6, wherein:
said flat surfaces each have a configuration which is substantially that of a parallelogram.

17. A strip of collated nails as set forth in claim 5, wherein:
said acute angle is approximately 36°.

18. A strip of collated nails as set forth in claim 6, wherein:
said acute angle is approximately 36°.

* * * * *